(12) United States Patent
Zahavi et al.

(10) Patent No.: US 6,450,180 B1
(45) Date of Patent: Sep. 17, 2002

(54) METHOD AND APPARATUS FOR THE LASER PROCESSING OF SUBSTRATE SURFACES

(75) Inventors: Dov Zahavi, Haifa; Natalie Levinsohn, Hadera; Shay Ghilai, Tel Aviv, all of (IL)

(73) Assignee: Oramir Semiconductor Equipment Ltd., Yokneam (IL)

( * ) Notice: Subject to any disclaimer, the term of this patent is extended or adjusted under 35 U.S.C. 154(b) by 0 days.

(21) Appl. No.: 09/314,205

(22) Filed: May 19, 1999

Related U.S. Application Data

(63) Continuation of application No. PCT/IL97/00365, filed on Nov. 12, 1997.

(30) Foreign Application Priority Data

Nov. 21, 1996 (IL) ................................................. 119672

(51) Int. Cl.⁷ ................................................. B08B 7/00
(52) U.S. Cl. ............................ 134/1.3; 134/1; 134/902
(58) Field of Search ............................ 134/1, 1.3, 902, 134/2; 219/121.73

(56) References Cited

U.S. PATENT DOCUMENTS

| | | |
|---|---|---|
| 4,670,639 A | 6/1987 | Behn |
| 4,857,697 A | 8/1989 | Melville |
| 4,914,270 A | 4/1990 | Copley et al. |
| 5,114,834 A | 5/1992 | Nachshon |
| 5,232,674 A * | 8/1993 | Mukai et al. |
| 5,474,549 A * | 12/1995 | Ortiz et al. |

FOREIGN PATENT DOCUMENTS

| | | |
|---|---|---|
| DE | 0200089 A1 | 12/1986 |
| DE | 0200089 B1 | 12/1986 |
| GB | 0276078 A1 | 7/1988 |
| WO | WO95/07152 * | 3/1995 |

* cited by examiner

Primary Examiner—Alexander Markoff
(74) Attorney, Agent, or Firm—Baker Botts LLP

(57) ABSTRACT

A method of laser treatment of surfaces comprises the steps of: I) projecting onto the substrate surface laser pulses defining a beam; II) causing said beam and said surface to become relatively displaced in such a way that said beam will intersect at each number of pulses, preferably at each pulse, an area of said surface that is different from and non-adjacent to the area the beam intersected before said displacement; and III) continuing to cause that the beam and said surface to be treated so to become relatively displaced, until all of said strips have thus been treated by the laser beam.

11 Claims, 8 Drawing Sheets

METHOD AND APPARATUS FOR THE LASER PROCESSING OF SUBSTRATE SURFACES

This Application is a continuation of PCT/IL97/00365 filed Nov. 12, 19997.

FIELD OF THE INVENTION

The present invention relates to a process and apparatus for treating surfaces with laser light, particularly, though not necessarily, for the removal of foreign materials from substrate surfaces, e.g. removal of photoresist from semiconductor surfaces.

BACKGROUND OF THE INVENTION

In the manufacturing of various products it is necessary to apply a layer of protective material on a surface, which must be removed after a specified manufacturing step has been concluded. An example of such process is the so-called "masking", where a pattern is created on a surface using a layer of protective material illuminated through a mask, and the surface is then treated with a developer which removes material from the unmasked portions of the surface, therefore leaving a predetermined pattern. The surface is then treated by ion implantation or by etching agents, which introduce the implanted species into the unmasked portions of the surface, or removes material from unmasked portions. Once these processes are completed, the role of the protecting mask ends and it must be removed. The process is conventional and well known in the art, and is described, e.g., in U.S. Pat. No. 5,114,834.

U.S. Pat. No. 5,114,834 describes photoresist removal by ablation, using laser UV radiation, in an oxidizing environment, as described. The ablation process is caused by strong absorption of the laser pulse energy by the photoresist. The process is a localized ejection of the photoresist layer to the ambient gas, associated with a blast wave due to chemical bonds breaking in the photoresist and instant heating. The partly gasified and partly fragmented photoresist is blown upwards away from the surface, and instantly heats the ambient gas. Fast combustion of the ablation products occurs, due to the blast wave and may also be due to the photochemical reaction of the UV laser radiation and the process gases. The main essence of the process is laser ablation with combustion of the ablated photoresist which occurs in a reactive gas flowing through an irradiation zone. The combination of laser radiation and fast combustion provides instantaneous lowering of the ablation threshold of hard parts of the photoresist (side walls). The combusted ablation products are then removed by vacuum suction, or by gas sweeping leaving a completelyclean surface.

Copending patent applications Nos. IL 115931 and IL 119246 (attorney's docket No. 4009) of the same applicant, the contents of which are incorporated herein by reference, describe and claim improved processes for laser removal of foreign materials from surfaces in the presence of reactive gases.

EP-A 0 200 089, corresponding to U.S. Pat. No. 4,670, 639, discloses and claims a method for forming narrow metal-free strips in a metallic layer on a plastic sheet, from which capacitors are manufactured, which consists in moving the sheet relative to a plurality of pulse laser beams, arranged parallel to one another in a single plane parallel to the direction of translation of motion of the sheet, to successively generate metal-free areas which are overlapped to form a narrow, completely metal-free strip. The footprint of the laser beam is circular and therefore adjacent two prints overlap to form a wavy edge. The metal-free strips are spaced from one another to leave a metallized area between them. The plastic sheet is then divided into capacitor elements in correspondence to the metal-free strips, which constitute an insulating edge region of the metallization.

While reference is made in this specification to the ablation of photoresist from semiconductor wafers, this will be done for the sake of simplicity, and because it represents a well known and widely approached problem. It should be understood, however, that the invention described hereinafter is by no means limited to the stripping of photoresist from wafers, but it applies, mutatis mutandis, to many other applications, such as stripping and cleaning of photoresist from Flat Panel Displays (FPD) or removal of residues from different objects, such as lenses, semiconductor wafers, or photo-masks.

The laser treatment for the removal of foreign material from surfaces, developed by the art until now, have been found to present certain drawbacks.

One drawback consists in that, as the laser beam sweeps over the surface to be treated, the gases in contact with said surface become depleted of oxidizing components and therefore less effective for the treatment and the depleted gases diffuse beyond the zone which has undergone treatment to the neighboring zones, so that, as the laser beam sweeps over said surface, it encounters increasingly depleted and ineffective gases. Another drawback is that, as a zone of the body being treated is contacted by the laser beam and heated thereby, heat is transferred to some extent to neighboring zones, so that as the laser beam sweeps over the surface to be treated, it encounters zones increasingly heated by conduction, the temperature of which becomes increasingly higher than that required for the treatment. A further drawback is that relatively deep and narrow depressions of the surface to be treated, and particularly their side walls, are not reached by the laser beam as fully as desirable It is a purpose of this invention to provide an improved process and apparatus for laser removal of foreign materials from surfaces.

It is another purpose of this invention to provide such a process and apparatus which eliminates the drawbacks of the known processes.

It is a further purpose of this invention to provide such a process and apparatus for laser treatment in the presence of reactive gases which permits to maintain an optimal composition of said gases over the treated zones.

It is a still further purpose of this invention to provide such a process and apparatus which avoids overheating of any portions of the treated body.

It is a still further purpose of this invention to provide such a method and apparatus that are based on simple and reliable optical means.

It is a still further purpose of this invention to provide such a method and apparatus that permits fully to treat the depressions of the treated surfaces, and in particular their side walls.

It is a still further purpose of this invention to provide a method and apparatus for the surface treatment of materials by laser pulses wherein which provide essentially stable conditions from pulse to pulse, without residual influence from previous pulses.

Other purposes and advantages of the invention will appear as the description proceeds.

SUMMARY OF THE INVENTION

The method of laser treatment of surfaces according to the invention comprises the steps of:

1) projecting onto the surface to be treated laser pulses defining a beam;
2) causing said beam and said surface to be treated to become relatively displaced in such a way that said beam will intersect at each number of pulses, preferably at each pulse, an area of said surface that is different from and non-adjacent to the area the beam intersected before said displacement; and
4) continuing to cause that the beam and said surface to be treated so to become relatively displaced, until all of said strips have thus been treated by the laser beam.

Preferably, the surface to be treated is ideally divided into a number of strips and said beam and said surface are caused to become relatively displaced in such a way that said beam will intersect at each number of pulses, preferably at each pulse, an area of said surface comprised in a strip that is different from and non-adjacent to the strip in which was comprised the area the beam intersected before said displacement.

The surface to be treated will be called hereinafter "the substrate surface". The substrate surfaces are generally not plane or smooth, but have projections and/or recesses created e.g. in the masking process or in another process used for imparting to said surface the desired pattern and properties. The expression "ideal surface corresponding to the surface to be treated" or "to the substrate surface", or, briefly "ideal surface", as used in this specification and claims, means the plane or smooth surface that would result from the smoothing out of said projections and/or recesses, or, in other words, the surface that existed before said masking or other process was carried out and would still exist had it not been carried out.

Preferably, the laser beam impinges on the ideal surface at an angle to the perpendicular to said surface.

In a preferred form of the invention, the relative displacement of the beam and said substrate surface comprises two displacement components: a switch of the beam from strip to strip and a scanning motion perpendicular of said strips. More preferably, the switch occurs between non-adjacent strips, and the scanning is continuous. Still more preferably, the switch is synchronous with the laser pulses and the scanning occurs at such a rate as to cause the laser beam to impinge a number of times on each point of substrate surface, said number of times being such as to cause the beam to apply to each such point a predetermined amount of energy.

The center lines of the strips can have any configuration, e.g. they may be circular, elliptical, spiral-shaped or have more complicated shapes. In a preferred embodiment of the invention, however, they are rectilinear.

While the last mentioned embodiment of the invention will be particularly described hereinafter, it should be understood that it constitutes only an example and that its description is not limitative in any way.

The relative scanning motion of the laser beam and of the substrate surface can be produced by displacing either the beam or the surface itself.

Preferably, the relative switches of the laser beam with respect to the substrate surface are synchronized with the laser pulses, generally so as to produce one switch for each passage from one pulse to the next.

In a preferred embodiment of the invention, the laser beam is firstly directed at any given portion of the substrate surface at a slant to one side of the perpendicular to the ideal surface and, after at least two switches, is directed to said portion or substantially thereto, at a second slant opposite to said first one. It can be said that, if $\alpha$ is the absolute value of the angle between the laser beam and said perpendicular, the beam is slanted alternatively by $+\alpha$ and by $-\alpha$. $\alpha$ is chosen as a function of the expected "Aspect Ratio", which is the ratio of depth to width of the depressions of the surface to be treated. Angle $\alpha$ is higher if the Aspect Ratio is lower, and vice versa. Indicatively, $\alpha$ may be the angle the cotangent of which is equal to the expected Aspect Ratio. While in the embodiments described it is assumed to be about 20°, it could have different values and, e.g., could be as high as 60° or even higher. When said angle is 20°, the expected Aspect ratio is close to 3 (2.777).

When the invention is used in laser stripping processes which involve treatment is an oxidizing atmosphere, as hereinbefore recalled, the process comprises feeding a reactive gas to flow over the substrate surface. In this case, preferably, the gas flows parallel to the strips in which the substrate surface is ideally divided.

The apparatus for carrying out the said method comprises, in combination with means for generating a laser beam constituted by a succession of pulses, means for deviating the laser beam and directing it to impinge successively on different, non-adjacent zones of a surface to be treated, according to a predetermined displacement succession.

The aforesaid laser beam generating, deviating and directing means, together, will be called sometimes "the laser beam apparatus".

In a preferred form of the invention, the substrate surface is ideally divided into a number of strips, and the means for deviating the laser comprise means for switching the beam from strip to strip and means for generating a relative scanning motion perpendicular of said strips. More preferably, the switching means switch between non-adjacent strips, and the scanning motion is continuous. Still more preferably, the switching means are synchronous with the laser pulses and the scanning motion has such a speed occurs as to cause the laser beam to impinge a number of times on each point of substrate surface, said number of times being such as to cause the beam to apply to each such point a predetermined amount of energy.

The laser beain can be deviated e.g. by means of prisms or of mirrors or of a combination of prisms and mirrors, and these and all other deviating means, collectively called "the beam deviating means", are included in the scope of the invention.

Preferably, the laser beam deviating and directing means are such and are so synchronized with said succession of laser pulses that the laser beam impinges on each zone of the substrate surface twice and at opposite slants thereto.

A preferred form of the apparatus for carrying out the method of the invention comprises, in combination with means for generating a laser beam:

I—a movable support carrying a number of laser beam upper deviating means, such as upper prisms (or mirrors);

II—means for actuating said support, particularly to rotate, to move at a controlled speed;

III—means for directing the laser beam to an active position, that is successively occupied by each of said upper deviating means, as the support moves;

IV—a stationary laser beam deviating means assembly, comprising a number of pairs of lower deviating means, such as prisms (or mirrors);

V—said upper deviating means being so shaped or oriented that each one of them directs said laser beam to a different one of said lower deviating means;

VI—said lower deviating means being so shaped (or oriented) as to direct said deviated laser beam towards the surface to be treated;

VII—the two lower deviating means of each said pair directing the twice deviated laser beam to the same zone of said surface at opposite slants thereto; and VII—means for relatively displacing said beam deviating means and said surface to be treated.

Preferably, said upper and lower deviating means are prisms or mirrors; and, more preferably, said means for actuating said support are so controlled that the frequency with which a prism (or mirror) occupies said active position is equal to the frequency of the laser pulses.

In a further preferred form of the apparatus, said support is a rotating wheel having a number of upper prisms (or mirrors) at its periphery, and the means for directing the laser beam to an active position successively occupied by each of said upper deviating means, as the support moves, are means for directing the laser beam to a position at said wheel periphery wherein it impinges successively on each of said prisms (or mirrors) as the wheel rotates.

Therefore, in such a form of the apparatus for carrying out the method of the invention comprises, in combination with means for generating a laser beam:

I—a rotating wheel having a number of upper beam deviating means at its periphery;

II—means for directing the laser beam to a position at said wheel periphery wherein it impinges successively on each of said beam deviating means as the wheel rotates;

III—a stationary beam deviating means assembly, comprising a number of pairs of lower beam deviating means;

IV—said upper beam deviating means being so shaped or oriented that each one of them refracts (or reflects) said laser beam to a different one of said lower beam deviating means;

V—said lower beam deviating means being so shaped (or oriented) as to refract (or reflect) said refracted (or reflected) laser beam towards the surface to be treated;

VI—the two lower beam deviating means of each said pair directing the twice refracted (or reflected) laser beam to the same elementary surface of said surface at opposite slants thereto; and VII—means for relatively displacing said wheel, upper prisms and lower beam deviating means and said substrate surface.

When the invention is used in laser stripping processes, such as those hereinbefore recalled, the apparatus also comprises a device, generally a cassette, for holding the body of which the substrate surface is a part (which can be briefly called "treated body"), e.g. a wafer, and providing a reactive gas atmosphere, and the means for relatively displacing the laser beam and the substrate surface may be means for displacing said device for holding said treated body.

The method of the invention, however, could be implemented by means of apparatus different from that herein described and such implementations are within the scope of the invention and of the claims appended hereto.

DETAILED DESCRIPTION OF PREFERRED EMBODIMENTS

Figure 8:
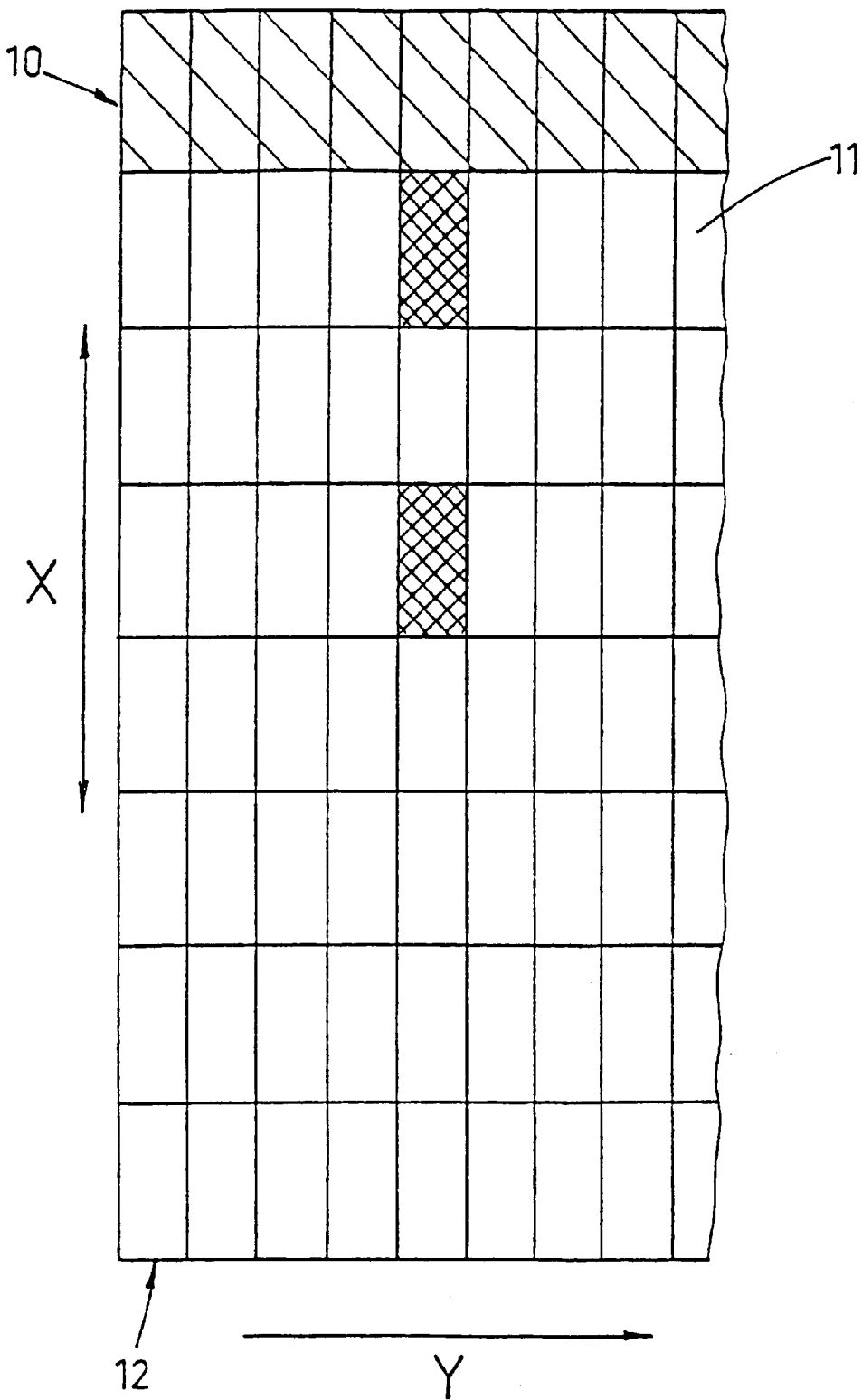
FIG. 8 geometrically illustrates the ideal division of the surface to be treated into different strips and elementary portions.

FIG. 8 geometrically illustrates the division of the treated surface into strips and elementary portions and has the main purpose of clarifying the terms used hereinafter in the description of the invention. The surface to be treated is ideally divided into strips 10, one of which is evidenced by hatching. The direction of the axes of the strips will be called the Y-axis or Y-direction or "the transverse direction". The strips, therefore, are transversely directed. They are distinguished by ordinal numbers I, II, . . . etc. Their number of strips will be indicated by "N" and is eight in FIG. 8, but this is of course only an example and "N" may be any convenient number. Each strip is ideally divided into a number of elementary portions 11, which are rectangular, having one side parallel to the Y-axis and the other perpendicular thereto, viz. parallel to what will be called the X-axis or the X-direction or "the longitudinal direction". Two such elementary portions are evidenced by crosshatching. The number of elementary portions in each strip is undetermined in FIG. 8, since the treated surface is shown as broken off parallel to the X-axis. The elementary portions or cells 11 have no independent or physical existence: they are merely areas defined by the area of the intersection of the laser beam with the ideal surface to be treated or ideal substrate surface and reference is made to them for the purpose of describing the invention, on the one hand, and of determining certain parameters relevant to carrying it out, on the other hand. Actually, for the aforesaid purposes the cells are preferably assumed to be slightly smaller than the intersections of the laser beams with the ideal surface. The cells that are aligned perpendicularly to the aforesaid strips form a longitudinal, strip-like area of the substrate surface and will be referred to as a "(longitudinal) row" of cells. The side of each elementary portion parallel to the X-axis, which is the longer side in FIG. 8, will be called its "length", and the side parallel to the Y-axis will be called its width. This should not be construed as implying that the side parallel to the X-axis must be the longer side: this is true in the preferred embodiment of the invention that will be described, but in other embodiments the opposite might be true.

Figure 1:
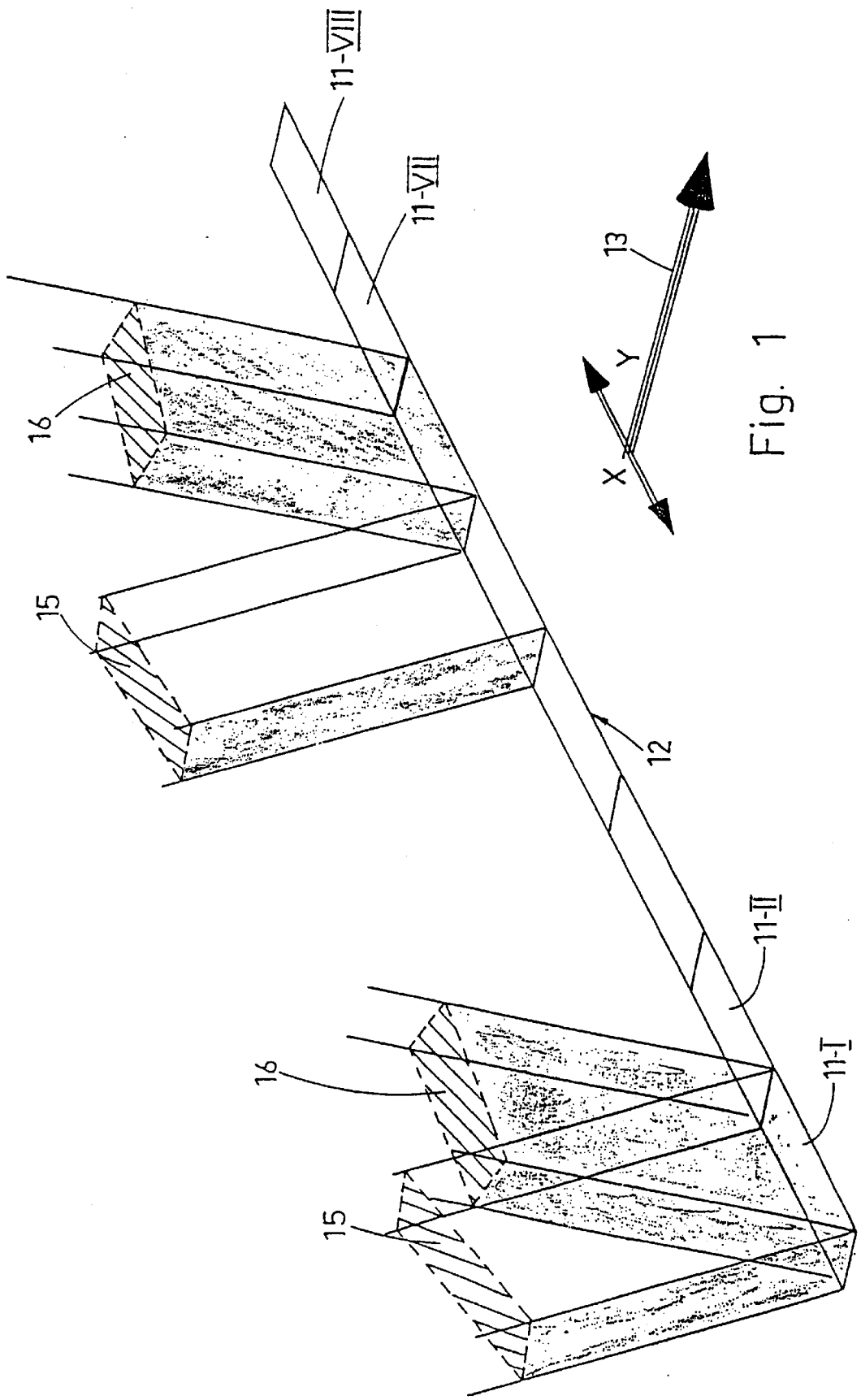
FIG. 1 is a schematic drawings which illustrates the intersection of the laser beam with the elementary portions of the substrate surfacing an embodiment of the method of the invention.

FIG. 1 schematically shows in perspective view a longitudinal row of cells or elementary portions 11, each belonging to a different transverse strip. Since in this embodiment said strips are in the number of eight, the elementary portions are identified by the ordinal number of the strip to which they belong, viz. by 11-I, 11-II, . . . , 11-VIII.

The laser beam, by which the substrate is treated, will switch longitudinally from strip to strip and will scan transversely along each strip in the manner which will be described, and always impinges on the substrate, or more accurately, on the ideal substrate, on an area having the dimensions of an elementary portion or slightly larger, as has been said. However, it does not impinge perpendicularly to the ideal substrate, but at a slant from two opposite directions. This is shown in FIG. 1, in which beams 15 impinging onto the substrate surface from one direction and beams 16 impinging onto it from the opposite directions are shown in schematic perspective view. As seen in FIG. 1, the slanted directions are such that one would pass from the one to the other by a rotation about an axis parallel to the X-axis, or, in other words, the beams are slanted towards each longitudinal row of cells from the two sides thereof. The X- and Y-axis (see FIG. 8) are indicated in FIG. 1. When the treatment is carried out in a reactive gas atmosphere, the gas flows in the direction of the Y-axis.

Various positions of the laser beam are indicated in FIG. 1. Although, as has been said hereinbefore, the dimensions of the beam are such that it intersects an area of the substrate surface that is slightly larger than the elementary portion, in FIG. 1, for the sake of simplicity, the beam is shown as intersecting exactly an elementary portion. In order to evidence the various positions of the beam, two cross-sections of a beam intersecting the same elementary portion 11-I at different slants are schematically shown in cross-hatching. If it is arbitrarily assumed that the slant is positive when the beam must be rotated clockwise with respect to the substrate surface in order to render it parallel to the perpendicular to the surface, and is negative when it must be rotated counterclockwise, then beam 15 is slanted at +α and beam 16 at −α.

The way in which the laser beam is switched from strip to strip can be exemplified as follows. Say that at the beginning the laser beam is directed to impinge on an elementary portion of the substrate surface with a positive slant at +α, and say, on cell 11-I. Then at the next pulse, the beam is shifted to impinge at the same slant on another cell of the same longitudinal row, comprised in another strip not adjacent to the preceding one. A succession of beam positions in different strips is established. A possible succession, in the case of FIG. 1, may be: 11-I, 11-IV, 11-VII, 11-II, 11-V, 11-VIII, 11-III, 11-VI. At this point all the cells 11 of the longitudinal row 12 that is being treated have been intersected by the beams at a slant +α. The slant is then reversed and the succession is repeated on the same longitudinal row 12 until all the cells 11 of said row 12 have been intersected by the beam at a slant −α. Then the entire row 12 has been treated and the beam must be transversely switched to treat another similar longitudinal row. However, while the (longitudinal) switch of the beam from one transverse strip to another occurs discontinuously, the (transverse) scanning motion of the beam from one longitudinal row to another occurs continuously, all by means that will be exemplified hereinafter. It will be understood that the means that produce the (longitudinal) switching also determine the length of the displacement that occur in each switch and that length, obviously, is the longitudinal dimension of each strip, viz. the length of a cell and depends on the parameters according to which the invention is carried out in each case. Thus each of the strips into which the substrate surface is ideally divided has a length—a transverse dimension—equal to one side of the substrate surface and a width—a longitudinal dimension—equal to the length of each switch of the laser beam. The transverse dimension depends on the size of the substrate surface; the longitudinal dimension depends on the process parameters.

Figure 2:
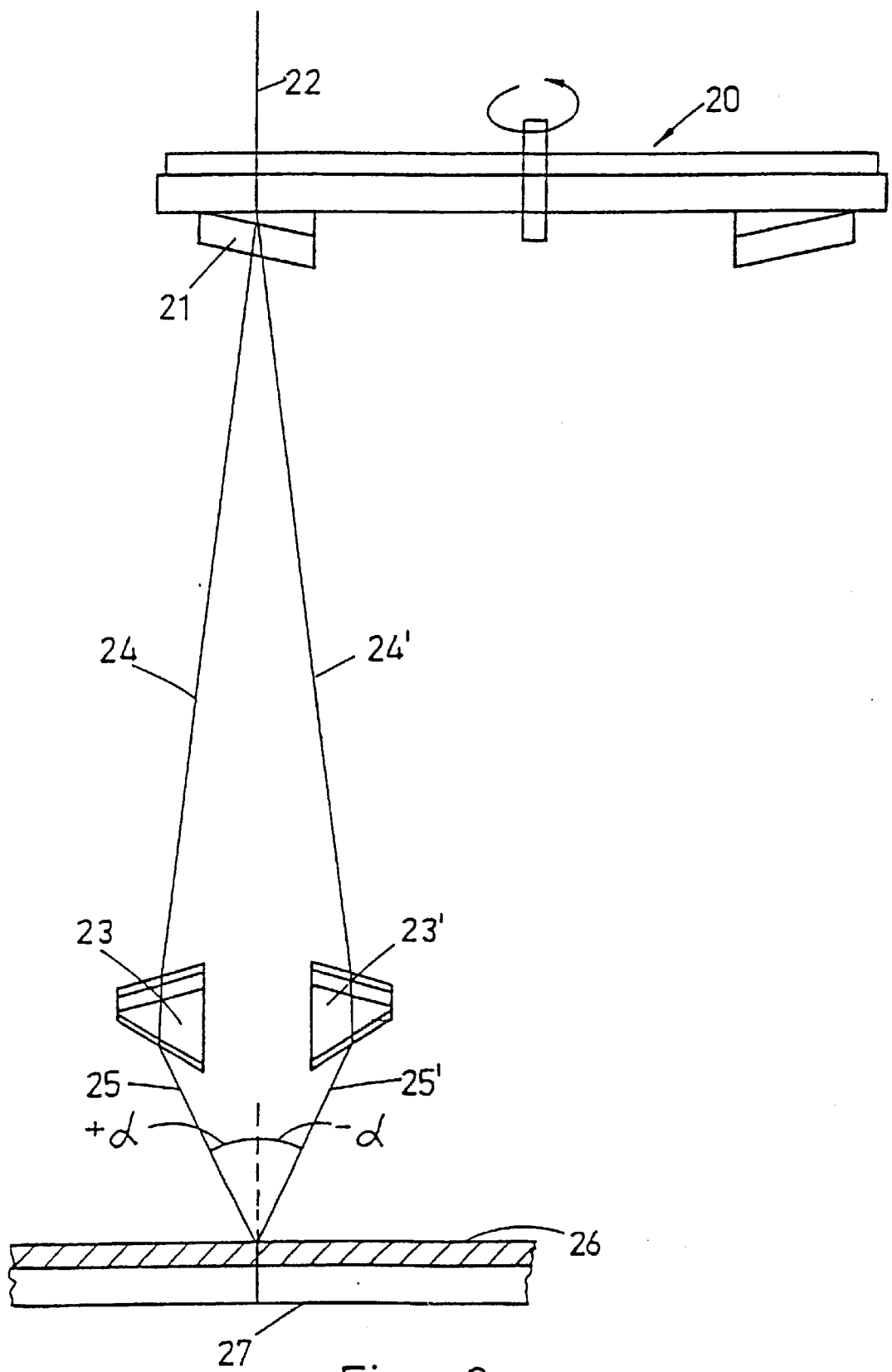
FIG. 2 is a schematic drawing illustrating the means by which the laser beam is directed onto the substrate surface in said embodiment.

FIG. 2 schematically illustrates how a laser beam, generated by any conventional generator, not illustrated, is directed at the desired slant onto the zones of the surface to be treated. Numeral 20 indicates a rotating wheel which has at its periphery a plurality of prisms 21 having different shapes, such as to produce the desired refraction effects that will be described. A laser beam 22, coming, for example, from a vertical direction as seen in the drawing, viz. parallel to the axis of wheel 20, will impinge on whatever prism 21 occupies at the moment a position along the path of the beam 22. Prism 21 will refract the laser beam producing a refracted beam. Two revolving prisms 21–21', only one of which is shown in FIG. 2, are associated with a pair 23, 23' of lower prisms, supported and assembled as will be described hereinafter. One of the two prisms 21–21' will produce a ray 24 which impinges on prism 23, while the other of said two prisms will produce a refracted ray 24' which impinges on the lower prism 23'. Prism 23 will refract the ray so that it produces a ray 25 which impinges on a given elementary portion of the substrate surface at a slant +α, while prism 23 will produce a refracted ray 25' which will impinge on the same elementary portion at a slant −α. The substrate surface is indicated at 26 and is part of a body such as a wafer 27. As has been said, mirrors, or other beam deviating means can be used in place of prisms.

The rotational speed of the wheel is constant and is calculated so that, if one multiplies the number of beam deviating means by the revolutions per second, one gets the maximum pulse rate of the laser, thus maximizing utilization of the laser.

As each prism (or mirror) moves in place, a pulse is sent to the laser, triggering it so that when the laser pulse arrives, it passes through said prism (or impinges on said mirror) and is deflected in the desired direction. Since the beam deflecting means must permit to shift the beam to impinge successively to all the transverse strips and on each strip from both lateral slants, the number of deflecting means must be equal (at least and preferably) to twice the number of strips, viz. to 2N. In the embodiment described, there are 8 strips and the deflecting means must be (at least and preferably) 16.

As has been said, the laser beam, besides being switched from one transverse strip to another, must also be scanned in a longitudinal direction along each strip. As has been said, the scanning is preferably continuous, viz. due to a continuous relative motion between the laser beam apparatus and the substrate surface. The scanning speed depends on the amount of energy that it is wished to be applied to each point of the substrate surface. Knowing the energy of the laser, one can easily calculate how many times the laser should impinge on each point of the substrate surface to apply to it the desired energy amount. Let us say that each elementary portion or cell has a length l and a width w. Then the area on which the laser beam impinges on the substrate surface at each pulse is lw, and if the elementary laser is E, the average density is E/lw. Based on this figure, one can determine how many times the laser must impinge on each point of the substrate surface in each treatment. Let us say that said number is n/sec. The speed with which the beam deviating means succeed one another in the path of the beam determines the frequency with which the beam is deflected in a given direction. Let us say that it is deflected in each direction, with each of its two possible slants (positive and negative), n times per second. Then in order that it should impinge on each point of the substrate surface m times per second, the scanning speed must be nw/m.

Say, by way of example, that the laser is designed for 250 pulses per second and that the beam deflecting means, e.g., prisms, are carried by rotating wheel in a number of 16, the transverse strips of the substrate surface being 8. By way of example, each prism may be 40 mm wide and be spaced by 5 mm from its neighbor. In that case, the internal diameter of the wheel will be 230 mm. Each one of the 16 prisms deflects the laser beam so that it will impinge on the substrate surface from either +20° or −20. The rotational speed of the wheel carrying the beam deflecting means should then be 250/16 =15.625 revolutions per second, because at this rotational speed, a beam deflecting means will be in place 16×15.625=250 times per second, and each time this happens, the laser will be triggered. Let us assume, by way of example, that the length of each elementary portion is 25 mm and its width is 3.7 mm. In that case, the scanning speed should be 15.625×3.7/10=5.8 mm/sec.

The wheel—or any other moving element carrying the upper beam deflection means—is automatically synchronized with the laser. There is no need for continuously controlling the synchronism: it suffices that said moving element be actuated at such a rate that the laser, operating at its optimal pulse rate, should fire when the beam deflection means are in place. The apparatus is so designed and operated as to produce the shifts and changes of the inclination of the laser beam along each transverse strip of the substrate surface, as has been described hereinbefore. For this purpose, all the prisms must have a specific shape, easily determined by a person skilled in the art, and the diameter and number of revolutions of rotating wheel 20 must be such that the successive prisms of the rotating wheel come into contact with the laser beam with a frequency that is related to the frequency of the pulses of said beam.

Figure 3:
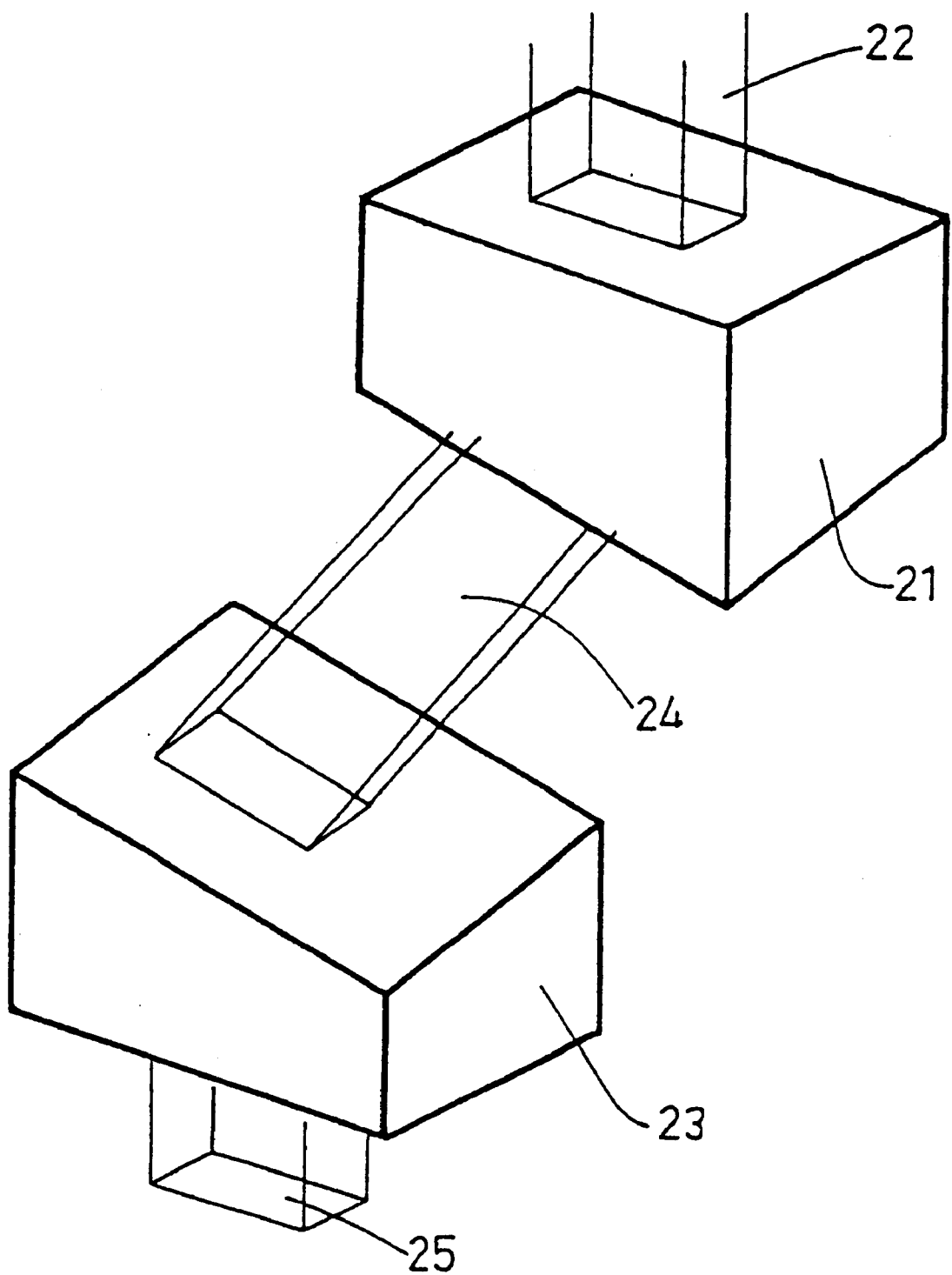
FIG. 3 schematically illustrates the operation of the upper and lower prisms of an apparatus according to an embodiment of the invention.

FIG. 3 schematically illustrates the way in which the laser beam 22 impinges on a revolving prism 21 (or 21') and is refracted by it as a beam 24 (or 24'), which impinges on a lower prism 23 (or 23') to produce a ray 25 (or 25') which finally impinges on the surface to be treated.

Figure 4:
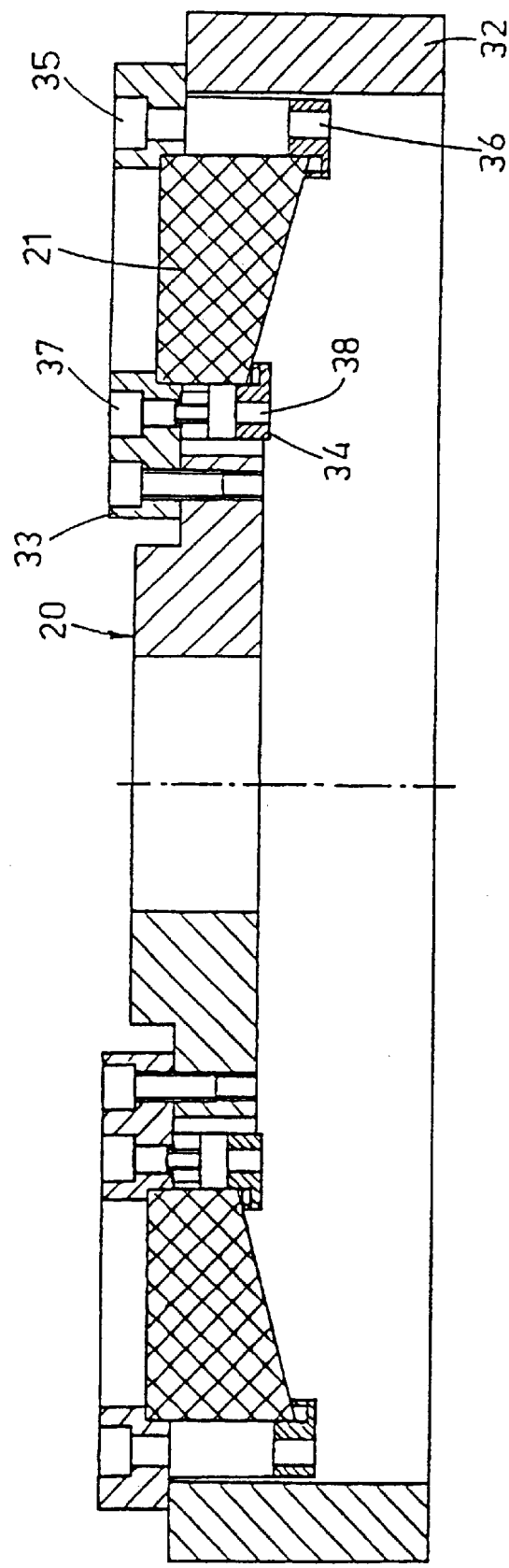
FIG. 4 is a schematic cross-section of the rotating wheel carrying the upper prisms, taken along the plane passing through the axis of the wheel and two, diametrically opposite prisms, in an apparatus according to an embodiment of the invention.

FIG. 4 is a schematic cross-section of an example of a rotating wheel 20, taken on an axial plane passing through two diametrically opposite prisms 21–21a. 32 indicates the body of the wheel, which is keyed to a rotary shaft in any convenient way, not shown. Prisms 21–21a are mounted on the wheel by means of upper retaining element 33 and lower retaining element 34, which are locked to one another by bolts, not shown in the drawing, passing through seats such as seats 35–36 and 37–38, and hold the prism firmly between them. It is apparent that many mechanical solutions can be adopted in structuring and mounting the wheel and securing the prisms to it, and that persons skilled in the art will have no difficulty in devising the best solutions for each particular case. Likewise, there will be no difficulty in mounting mirrors instead of prisms on the wheel.

Figure 6:
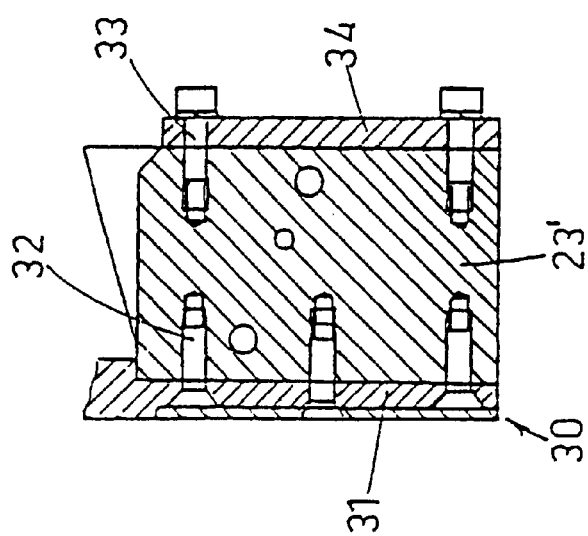
FIG. 6 is a partial cross-section of the assembly of FIG. 5 taken along plane VI—VI of FIG. 5.
Figure 5:
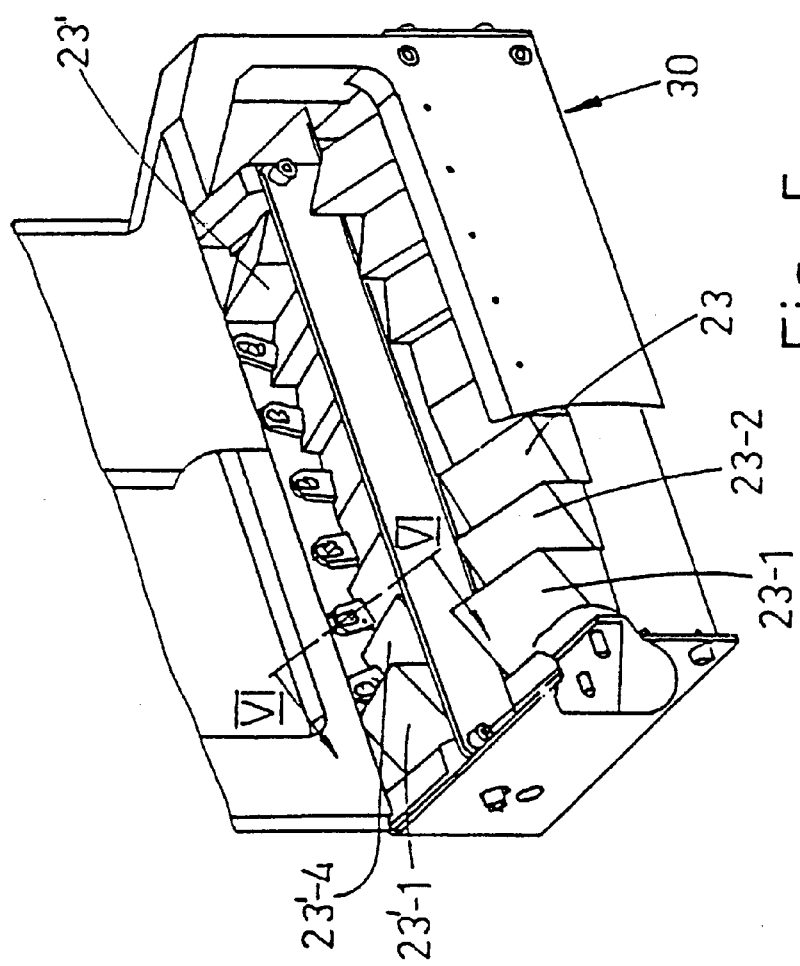
FIG. 5 is a schematic perspective view of the assembly of lower prisms, in the same apparatus.

FIG. 5 shows in perspective view an assembly of lower prisms which comprises eight pairs of prisms 23 and 23', and FIG. 6 is partial cross-section thereof. The prisms numbered from 1 to 8: 23-1, 23-2, . . . , 23-8, and 23'-1, 23'-2, . . . , 23'-8. Prisms 23-1 and 23'-1 of the first pair are associated with the first cell 11-1 of each strip of the substrate surface, prisms 23-2 and 23'-2 of the second pair are associated with cell 11-2, and so forth. The prisms are supported in a housing generally indicated at 30, a part of which is broken off in the drawing for purposes of illustration. The upper part of the housing, which is not shown, has no influence on the optics of the apparatus and serves to mount the assembly in place. Therefore it may have any structure that is suitable for this purpose in each particular apparatus The treated body can be supported in any suitable way in the desired positioned relationship with respect to container 30. It may be displaced relatively to it—and therefore to the entire laser beam apparatus, since the lower deviating means are in a fixed position with respect to the axis of the wheel carrying the upper deviating means and to the laser generating means—to provide the scanning motion. Or the treated body may be kept stationary and the whole laser beam apparatus—laser source, rotating wheel axis and lower deviating means assembly—be moved to provide the scanning motion. In any case, providing the mechanical means for producing the scanning motion is within the capabilities of skilled persons and such means may be conventional and therefore are not described.

Means for supporting a body, particularly a wafer, are known in the art. For instance, a cassette used for processing wafers by laser in the presence of another reactive gas is described in copending application of the same applicant No. 115934, the contents of which are incorporated herein by reference. However, other supports can be easily devised by persons skilled in the art, it only being sufficient that they should support the treated body and allow passage of the laser beam to impinge on it, and further that, if the laser treatment is carried out in the presence of a reactive gas, means be provided for causing the gas to flow over the treated body.

The invention provides an improvement over previously known processes and eliminates the drawbacks which have been pointed out hereinbefore. Say, for example, with reference to FIG. 1, that the laser beam has treated portion 11-IV and has now shifted to portion 11-VII. When the treatment is carried out in the presence of a reactive gas, it will have become depleted of oxidizing components in correspondence to portion 11-IV and to a lesser, but significant extent in correspondence of the adjacent portions 11-III and 11-V However, its composition will be quite intact in correspondence of portion 11-VII, which is now being treated by the laser beam. Some time will pass before the laser beam returns to section 11-IV: precisely the time required to treat six other portions. In this period of time, the gas, in correspondence of portion 11-IV, will have been fully replaced by fresh gas blown across the treated surface and will have the optimal composition. While portions 11-III and 11-V, in correspondence to which the gas has been partially depleted, will be treated before section 11-I, a replacement of partially depleted gas with fresh gas will have occurred to a sufficient extent before they are so treated.

Likewise, when the laser has treated section 11-IV, it will have partially heated sections 11-III and 11-V also. The effect of the partial heating, however, will have disappeared and the undesired heat will have been dissipated before the laser returns to section 11-IV or to neighboring sections. These features of the invention permit to operate with a greater frequency of pulsing, whereby the process has high yield and is particularly effective.

Further, the fact that the laser beam is directed at an angle to the perpendicular to the ideal surface, and, preferably, at two symmetrical angles thereto, permits the. beam to illuminate the side walls of depressions that have a high Aspect Ratio better than would a perpendicular beam. In this way, and because the slant of the laser beam is reversed in two successive impingements on the same zone, no portions of the actual treated surface are beyond its reach, nor are zones of shadow created in which the treatment would be ineffective. This is a very important feature, particularly in the semiconductor industry.

Another feature of the invention is that the beams illuminating each cell do not seem to come from a single point.

Each cell is illuminated by two beams, at +20° and −20°, seeming to originate from a plane perpendicular to the substrate surface. This generates two lines virtual illuminating sources, equal in number to the number of cells, each of said sources illuminating its own cell.

It is seen therefore that the invention provides a substantial progress of the art.

It will be understood, from the following description, that, in view of the fact that the scanning motion is continuous, the laser beam never returns exactly to the same cell. It would be possible to cause it to so return by producing a scanning motion which is incremental and is such that the beam shifts, relatively to the substrate surface, in the direction of the Y axis after each "m" pulses. This variant is comprised in the invention. However, it involves mechanical complications and a continuous scanning motion is preferred. In this motion, the intersection of the laser beam with the substrate surface, which has the dimension of a cell, shifts continuously in the direction of the Y axis, so that the cells have no independent structure or functional existence, and are merely ideal process units used in calculating the parameters of the method and apparatus according to the invention.

Figure 9:
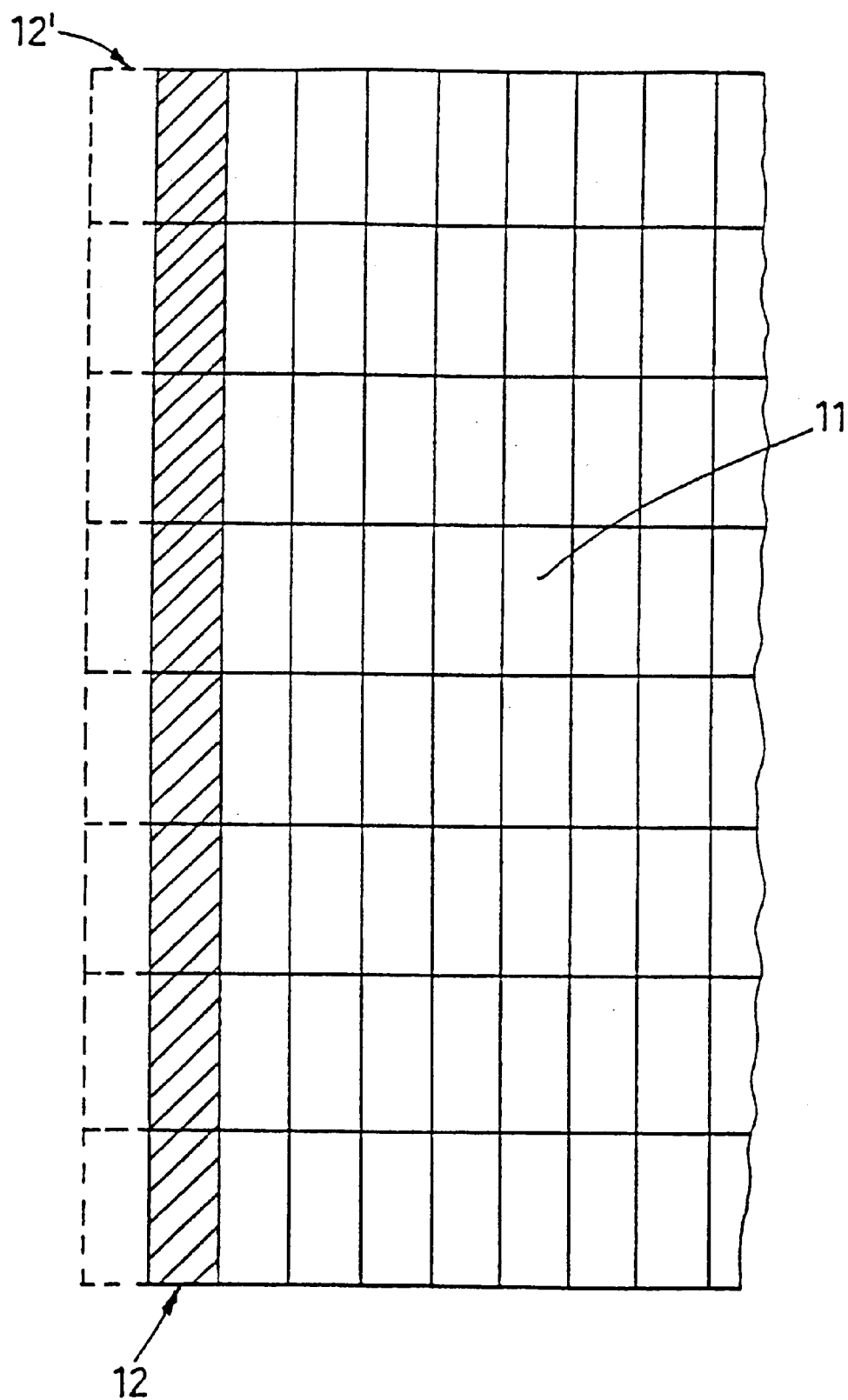
FIG. 9 is similar to FIG. 8 and schematically illustrates a preferred variant of the invention.

It should be noted that if the scanning of the laser beam is begun from a longitudinal row 12 that is at an edge of the substrate surface, that row will not receive the same, full amount of energy that it is intended to apply to each row and that is in fact applied to the other rows. In order that said first row should be fully treated, it is necessary to start the scanning of the laser beam from an additional longitudinal row that is not part of the substrate surface and is located before the edge of said surface. This is illustrated in FIG. 9, which is similar to FIG. 8, and in which the first, marginal row 12 of the substrate surface is evidenced by hatching, and additional row 12', not part of said surface, from which the scanning of the laser beam is begun, is shown in broken lines.

Figure 7:
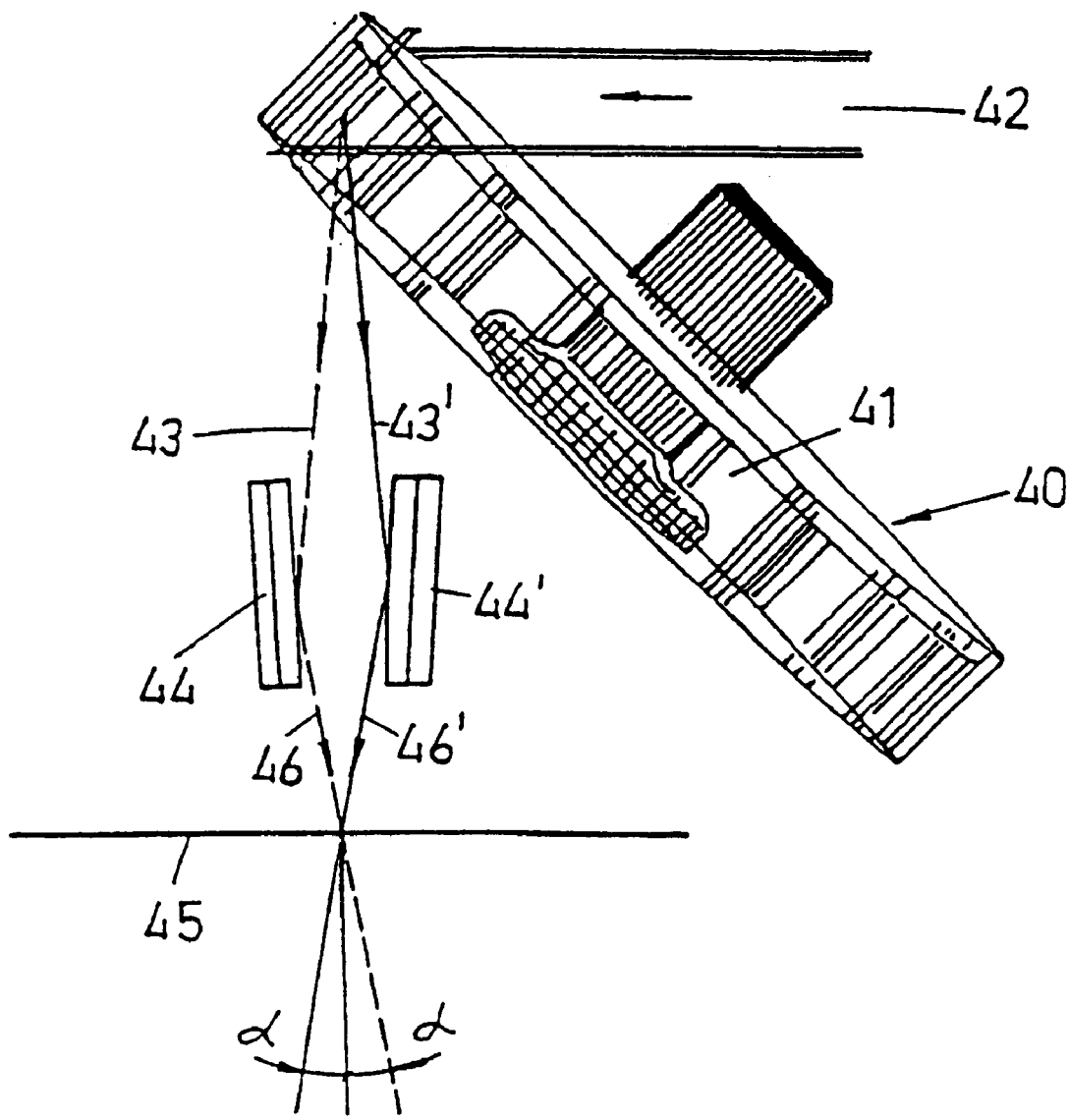
FIG. 7 is a schematic perspective view illustrating another embodiment of the invention.

As has been said before, mirrors can be used in place of prisms. FIG. 7 illustrates in schematic perspective view, an embodiment using mirrors. A mirror wheel 40, rotatable by means not illustrated, carries on its periphery a number of mirrors 41, a laser beam 42 is so directed as to impinge on the periphery of the wheel to each prism when it reaches a certain angular position. The mirrors reflect the laser beam as indicated at 43 onto lower mirrors schematically indicated at 44 and 44', which correspond to beam angles +α and −α and reflect the beam, e.g., as indicated at 46, onto the substrate surface schematically indicated at 45. In all respects other than the use of reflecting instead of refracting elements for deviating the laser beam, this embodiment need not differ from those previously described.

While specific examples of the invention have been described by way of illustration, it will be apparent that the invention can be carried out by persons skilled in the art with many modifications, variations and adaptations, without departing from its spirit or exceeding the scope of the claims.

What is claimed is:

1. A method of laser treatment for the ablation, by UV laser radiation in an oxidizing environment, of photoresists from substrate surfaces chosen from the group consisting of semiconductor wafers and flat panel, said method comprising:
    (a) dividing a substrate surface into a plurality of transverse strips, said transverse strips being parallel and adjacent each other, each of said strips being divided into a number of elementary portions;
    (b) irradiating a pulse laser beam onto a first of said elementary portions comprised in a first of said strips;
    (c) irradiating said beam onto a second of said elementary portions comprised in a second of said strips, wherein said second of said strips is not adjacent to said first of said strips;
    (d) thereafter, successively irradiating said beam onto said elementary portions arranged in such a succession that each of said portions is comprised in a strip which is different from the strip which comprises the immediately preceding and from the strip which comprises the immediately following ones of said elementary portions; and
    (e) continuing to irradiate said beam onto said elementary portions of said succession until all of said elementary portions of said plurality of transverse strips have been irradiated.

2. The method of claim 1, wherein said pulse laser beam impinges on each elementary portion of said substrate surface successively at two angles opposite to one another relative to a plane perpendicular to said substrate surface.

3. The method of claim 1, wherein said pulsed laser beam is displaced relative to said substrate in a continuous manner parallel to said transverse strips and in a discontinuous manner perpendicular to said transverse strips.

4. The method of claim 3, wherein said pulsed laser beam irradiates a portion of said transverse strips with a predetermined amount of energy.

5. The method of claim 1, wherein said transverse strips are rectilinear.

6. The method of claim 3, wherein said displacement of said pulsed laser beam relative to said substrate is effected by displacing said beam.

7. The method of claim 3, wherein said displacement of said pulsed laser beam relative to said substrate is effected by displacing said substrate.

8. The method of claim 3, wherein said displacement of said pulsed laser beam relative to said substrate is synchronized with laser pulses.

9. The method of claim 2, wherein said angle is equal to arc cotangent of an expected aspect ratio of substrate surface depressions.

10. The method of claim 9, wherein said angle is between 20 and 60 degrees.

11. The method of claim 1, wherein an oxidizing gas flows over the substrate surface parallel to said transverse strips.

* * * * *